April 3, 1934.  T. M. MUELLER  1,953,252
TRANSMISSION
Filed Aug. 9, 1933  4 Sheets-Sheet 1

INVENTOR.
Theodore M. Mueller
BY George B. Ingersoll
ATTORNEY.

April 3, 1934. T. M. MUELLER 1,953,252
TRANSMISSION
Filed Aug. 9, 1933 4 Sheets-Sheet 2

INVENTOR.
Theodore M. Mueller
BY George B. Ingersoll
ATTORNEY.

April 3, 1934.  T. M. MUELLER  1,953,252
TRANSMISSION
Filed Aug. 9, 1933  4 Sheets-Sheet 3

INVENTOR.
Theodore M. Mueller
BY George B. Ingersoll
ATTORNEY.

April 3, 1934.　　　T. M. MUELLER　　　1,953,252
TRANSMISSION
Filed Aug. 9, 1933　　　4 Sheets-Sheet 4

INVENTOR.
Theodore M. Mueller
BY
George B. Ingersoll
ATTORNEY.

Patented Apr. 3, 1934

1,953,252

UNITED STATES PATENT OFFICE 1,953,252

TRANSMISSION

Theodore M. Mueller, Pontiac, Mich.

Application August 9, 1933, Serial No. 684,346

15 Claims. (Cl. 74—34)

My invention relates to improvements in transmissions in which changes of speeds are accomplished automatically; and the objects of my improvement are, first, to provide a transmission device whereby changes of speeds are accomplished automatically in accordance with the amount of torque resistance imposed upon the transmission; second, to provide for positively driving a plurality of mechanisms controlled to operate in harmony to permit a single driving means therefor; third, to provide facilities for varying speeds without the necessity of shifting gears through fixed ranges or ratio steps; fourth, to afford facilities whereby a flywheel mechanism is adapted to control the driving movement of a revolvably mounted housing in one driving direction in accordance with a decrease of torque reaction imposed thereon; fifth, to provide a one way drive clutch to permit the driving of a revolvably mounted transmission in one direction only; sixth, to provide a transmission with gear mechanism that will provide "free wheeling" characteristics without incorporating so called free wheeling or overrunning mechanisms; seventh, to provide a transmission having constantly meshed gear mechanism adapted to automatically provide varying driving gear ratios; eighth, to provide a transmission which will operate with the driving torque applied to either its regular main drive shaft or to its main driven shaft; ninth to provide a transmission utilizing a fly wheel speed ratio control mechanism; tenth, to provide a transmission utilizing a revolvably mounted housing restrained from moving in an opposite direction from the driving torque to accomplish varying driving gear ratios; eleventh, to provide a gear ratio changing mechanism actuated in response to varying torque reactions.

I attain these objects by the mechanism illustrated in the accompanying drawings, in which—

Similar numerals refer to similar parts throughout the several views.

Figure 1:
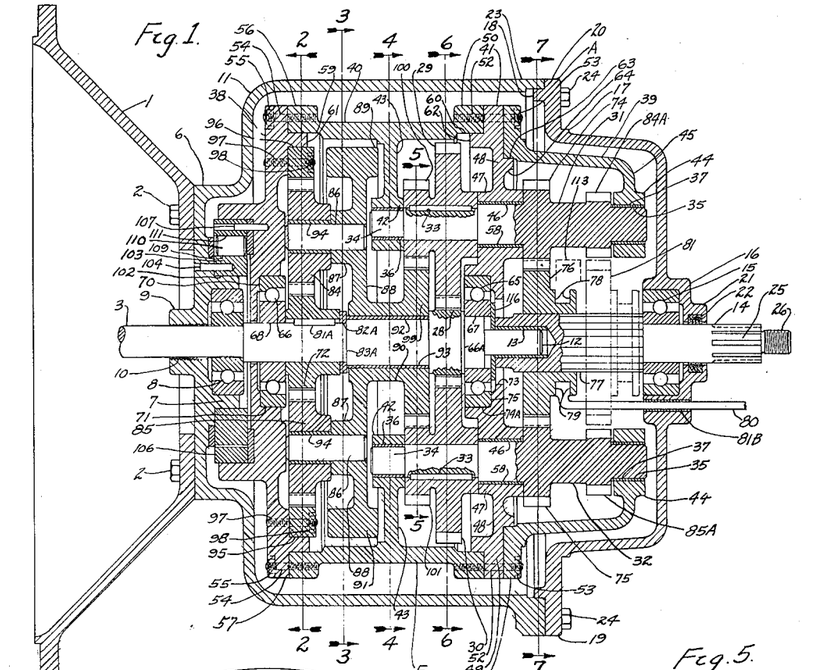
Figure 1 is a vertical section of the transmission on its longitudinal center, said transmission being disclosed as being supported on a conventional clutch housing.
Figure 12:
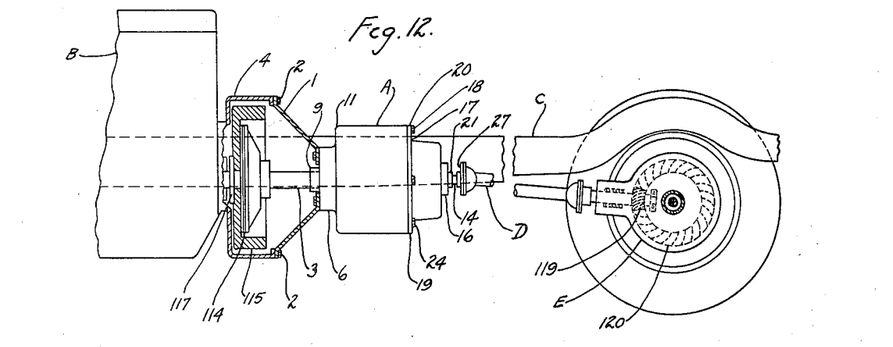
Fig. 12, a side view of my transmission installed in conjunction with the driving and driven units of an automotive vehicle.

The transmission assembly A is disclosed as being suitably secured to the clutch housing 1 by the screws 2, the clutch housing 1 being utilized to enclose a suitable clutch mechanism 114 of any desired type, a conventional clutch mechanism 114 being disclosed for operatively connecting the drive shaft 3 with the flywheel 115 and crankshaft 117 of the engine assembly B which is suitably supported from the frame assembly C of the automotive vehicle as disclosed in Fig. 12.

The transmission assembly A is provided with the extension portion 6, which forms a portion of the transmission case 11, and is provided with the boss 7 in which is retained the bearing assembly 8 which revolvably supports the drive shaft 3 at the front end of the transmission assembly A, the extension portion 6 being further provided with the extension portion 9 which may be provided with suitable means, such as the threads 10, for enclosing the drive shaft 3 to prevent the escape of lubricating medium from the transmission assembly A at its forward end.

The drive shaft 3 is supported at its rear end by its stub or extension portion 12 being journalled in the bushing 13 which is suitably mounted in the forward end of the main or driven shaft 14 which is revolvably supported at its rear end in the bearing assembly 15 which is retained in the boss portion 16 of the cover member 17 which closes the open rear end of the transmission case 11, the cover member 17 being provided with the pilot portion 18 which enters and fits within the pilot bore 23 of the transmission case 11, thus providing that the cover member 17 will be mounted in alignment with the transmission case 11. The cover member 17 is secured to the transmission case 11 by the screws 24 extending through the flange 19 to engage portions of the transmission case 11, the upper portion of the flange 19 being cut away at 20 to provide greater operative clearance space between the transmission assembly A and adjacent portions of the vehicle, such as body portions, etc. (not disclosed) which are usually mounted above the transmission and power units of the automotive vehicle. The cover member 17 is further provided with the boss portion 21 in which is retained the packing material 22 which contacts and encloses the main shaft 14 to prevent the escape of lubricating medium from the transmission assembly A at its rear end. The main shaft 14 is provided with the splines 25 and the threaded portion 26 to facilitate attachment to the flange 27 of the propeller shaft assembly D which transmits torque between the transmission assembly A and the rear axle assembly E as hereinafter more fully disclosed.

It is to be noted that the drive shaft 3 and the main shaft 14 are thus adapted for relative rotation one to the other with varying or different speeds and are also adapted to rotate in unison at the same speed.

The drive shaft 3 is provided with the gear 28, which may be constructed integrally therewith as disclosed or suitably secured thereto, to form a positive driving connection with the gears 29 and 30 which are oppositely disposed in the transmission assembly A to provide a balanced design and to eliminate any unbalanced centrifugal forces in the transmission inner housing assembly F which is revolvably mounted, as hereinafter disclosed relative to the fixedly mounted transmission case 11. The gears 29 and 30 are respectively secured to the shafts 31 and 32 by the keys 33, the shafts 31 and 32 being provided with the stub or extension portions 34 and 35 which are respectively journalled in the bushings 36 and 37.

The composite housing of the inner assembly F of the transmission assembly A is formed by the end housing member 38 at the front of the inner housing assembly F, the end housing member 39 at the rear of the inner housing assembly F, and the intermediate housing members 40 and 41 which are mounted between said end housing members 38 and 39.

The bushings 36 are suitably mounted in the bosses 42 which are connected with the annular flange or web portions 43 which are connected to the outer wall portion of the intermediate housing 40 and the bushings 37 are suitably mounted in the bosses 44 of the flange or web portion 45 of the end housing member 39, the central or inner portion of the end housing 39, with its bosses 44, being open to extend around and provide operative clearance around the main shaft 14 and its operatively connected mechanism, as hereinafter disclosed, the central or inner portion of the web portion 43 and the bosses 42 being open to extend around and provide operative clearance for gear mechanism hereinafter disclosed.

The shafts 31 and 32 are each further provided with the bearing portions 46 which are journalled in the bushings 58 which are suitably secured in the bosses 47 of the web or flange portion 48 which is connected with the flange portion 49 of the intermediate housing 41 which is suitably secured between the flange 51 of the rear end housing 39 and the flange 50 of the intermediate housing 40 by the studs 52 and nuts 53, said studs 52 being suitably anchored in the flange 50 of the intermediate housing 40 and extending through the flange 49 of the intermediate housing 41 to engage the nuts 53.

In a similar manner the front end housing 38 is secured to the intermediate housing 40 by the studs 54 and the nuts 55, the studs 54 being suitably anchored in the flange 56 of the intermediate housing 40 and extending through the flange 57 of the front end housing 38 to engage the nuts 55, the nuts 53 and 55 being suitably recessed in the respective flanges to provide greater operating clearance within the transmission case 11.

The intermediate housing, 40 is provided with the pilot bores 59 and 60 for receiving the pilot portions 61 and 62 respectively of the front and intermediate housings 38 and 41, the rear end housing 39 being provided with the pilot bore 63 for receiving the pilot portion 64 of the intermediate housing 41, the end housings 38 and 39 together with the intermediate housings 40 and 41 thus being accurately secured in alignment in their assembled positions.

It is to be noted that the inner housing assembly F of the transmission assembly A, together with its operatively supported mechanisms, as above and hereinafter to be more fully disclosed, is revolvably mounted upon the bearing assemblies 65 and 66 which are suitably secured, as by being pressed thereon, to the respective portions 67 and 68 of the drive shaft 3, the bearing assembly 65 being longitudinally retained by the shoulder 66A and the thrust washer 116, said thrust washer 116 being operatively mounted between and spacing the inner race of the bearing assembly 65 and the inner end of the main shaft 14, the bearing assembly 65 thus being located adjacent and between the gear 28 and the operatively supporting portions of the shafts 3 and 14, namely the extension portion 12 journalled in the bushing 13, the bearing assembly 66 being longitudinally retained adjacent the shoulder 70 of the bore 71, of the front end housing 38, the bore 71 receiving the outer race of the bearing assembly 66, the bearing assembly 66 being further retained by its inner race operatively contacting the front end surface of the gear 72 which is hereinafter operatively disclosed. The web 48 of the intermediate housing 41 is provided with the opening or bore 73 to extend around and provide operating clearance relative to the main shaft 14 and is also provided with the bore 74A and shoulder 75 for receiving and retaining the bearing assembly 65.

The shafts 31 and 32 are respectively provided with the gears 74 and 75 which operatively engage with the gear 76 which is slidably mounted on the splines 77 of the main shaft 14, the gear 76 being provided with the groove 78 which is engaged by the shift collar 79 suitably connected to the draft member or shift rod 80 which may extend through a suitable opening 81B, in the boss portion 16 of the cover member 17, said draft member 80 being suitably constructed and connected with manually or power operated means (not shown) whereby the driver of the vehicle, which is equipped with my transmission, can readily shift the gear 76 from its position as disclosed by full lines, Fig. 1 to the position, as disclosed by the dotted lines, at 81, Fig. 1.

Figure 8:
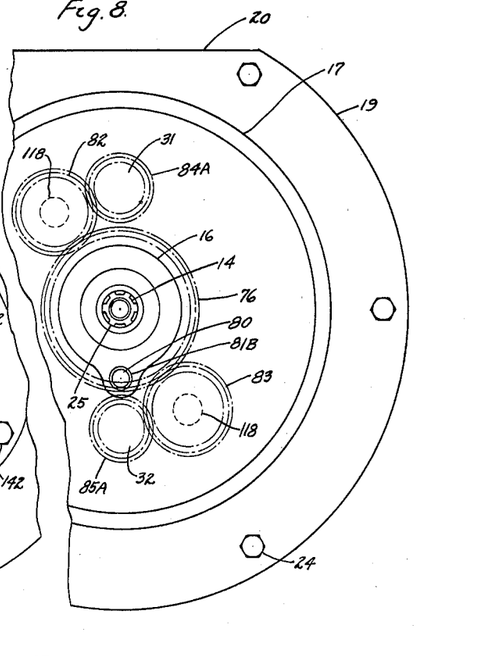
Fig. 8, an end view of the transmission disclosed in Fig. 1, the reverse gear mechanism being indicated therein.

It is to be noted that when the gear 76 is thus shifted to the position 81, the gear 76 will operatively engage the reverse idler gears 82 and 83 which are revolvably mounted on the stud or shafts 118 which are suitably anchored in portions of the housing member 39, said gears 82 and 83 being in constant mesh engagement with the gears 84A and 85A, as disclosed in Fig. 8, and which are respectively connected with the shafts 31 and 32, the gear 76 being operatively disconnected from direct engagement or contact with the gears 84A and 85A when said gear 76 is in the position 81 as indicated by dotted lines, Fig. 1.

It is to be here noted, that I have thus far described a transmission mechanism that will provide a drive through a train of gears or low speed gearing, namely the gear 28, the gears 29 and 30, the gears 74 and 75, and the gear 76, which thus will transmit driving torque from the drive shaft 3 to the main shaft 14 in one direction, namely a direction corresponding to the forward motion of the vehicle and a clockwise operation of the engine, when viewed from the front of the vehicle, when the gear 76 is in the position as disclosed by full lines in Fig. 1, and in an opposite direction, namely a direction corresponding to the reverse or rearward motion of the vehicle, when the gear 76 is in the position as disclosed by the dotted lines 81, Fig. 1.

With this clearly in mind, it will be readily understood, as hereinafter disclosed, that my transmission provides a drive through two separate means or gear mechanisms, the first drive being through the low speed gearing as above set forth and the second drive through an internal gear mechanism, the various parts of the mechanism of the second drive now being set forth and described as follows:

The gear 72, which was mentioned in the above portion of the description, is secured to the drive shaft 3 by the key 81A, the gear 72 being located longitudinally between the inner race of the bearing assembly 66, as above mentioned, and the thrust washer 82A which fits against and is backed up by the shoulder 83A of the drive shaft 3.

The gear 72 meshes and operates with the gears 84 and 85 which are rotatively mounted on the studs or shafts 86 which are suitably secured and anchored in the bosses 87 which are connected with the web or flange 88 of the flywheel or idler bracket member 89, the web 88 connecting the hub 90 with the rim portion 91, the hub portion 90 being provided with the bushing 92 which has a bearing on the journal portion 93 of the drive shaft 3. The gears 84 and 85 are each provided with the bushings 94 which have a bearing on the journal portions of the studs 86.

The internal gear 95 fits within and is centered by the bore 96 of the front end housing 38, the internal gear 95 being suitably secured therein by the studs 97 which are suitably secured in the front end housing 38 and extend through the internal gear 95 to engage the nuts 98 which may be suitably recesses in the internal gear 95 to provide greater operating clearance.

The internal gear 95 meshes and operates with the gears 84 and 85. The flywheel 89 is, as above described, rotatively mounted on the journal portion 93, of the drive shaft 3, and is provided and connected with the gear 99 which meshes and operates with the gears 100 and 101 and rotatively operates with the gears 29 and 30 in the shafts 31 and 32.

Figure 2:
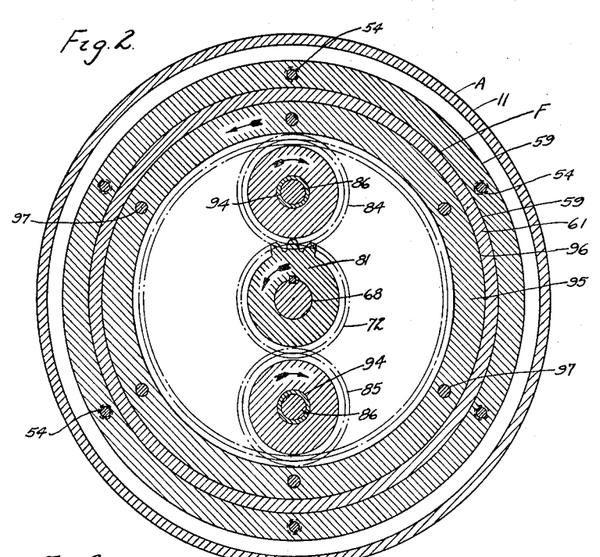
Fig. 2, a vertical section of the transmission taken on the line 2—2, Fig. 1.
Figure 3:
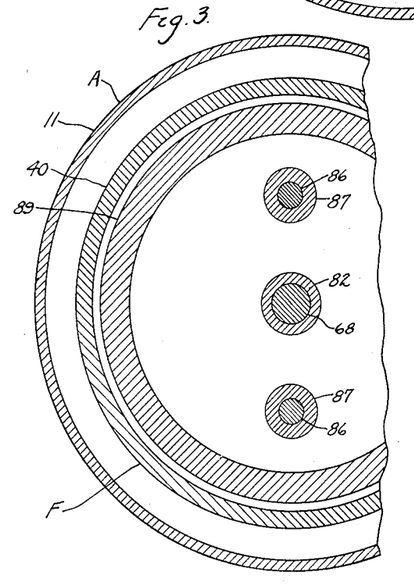
Fig. 3, a partial vertical section of the transmission taken on the line 3—3, Fig. 1.
Figure 4:
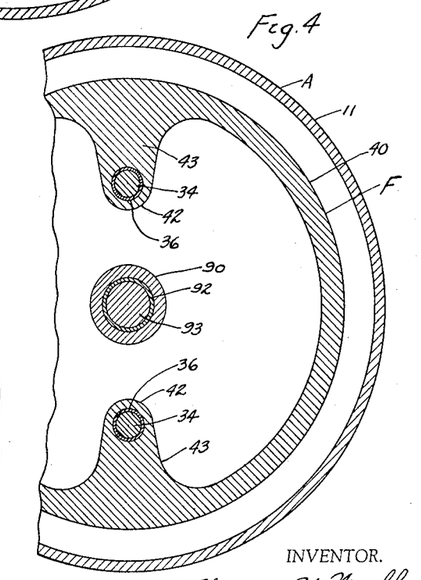
Fig. 4, a partial vertical section of the transmission taken on the line 4—4, Fig. 1.
Figure 5:
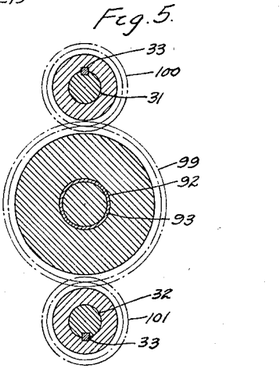
Fig. 5, a partial section of a portion of the gearing of the transmission on the line 5—5, Fig. 1.
Figure 6:
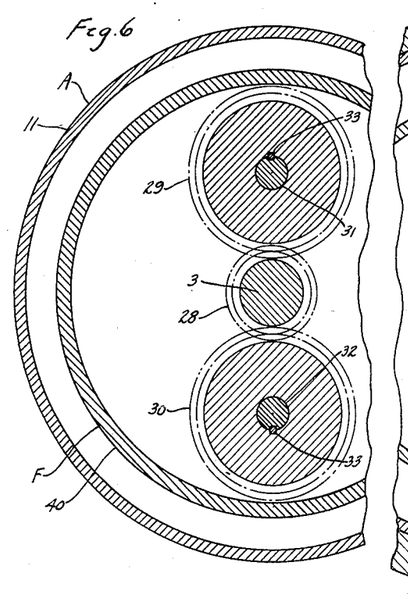
Fig. 6, a partial vertical section of the transmission taken on the line 6—6, Fig. 1.
Figure 7:
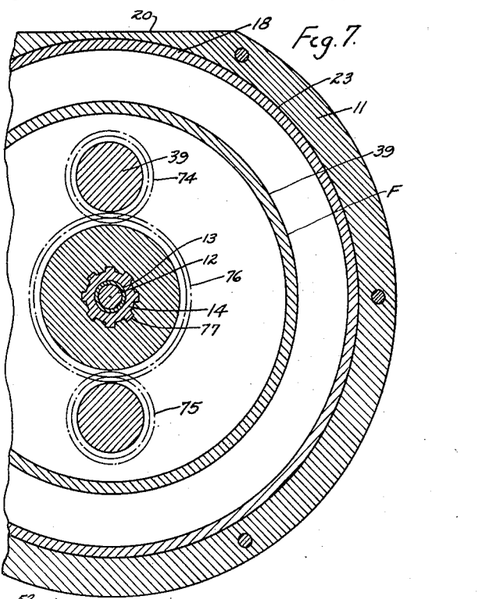
Fig. 7, a partial vertical section of the transmission taken on the line 7—7, Fig. 1.

It is now to be noted that the second drive means of my transmission is accomplished by the drive shaft 3, the gears 84 and 85, and the internal gear 95 which is secured to the front end housing 38 and thus insures that the inner housing assembly F will be driven with a revolving motion in a direction with the rotation of the engine, which in this case is in a clockwise direction, as viewed from the front of the vehicle. It is to be noted that the inner housing assembly F is restrained from rotation in an opposite direction by the one way clutch mechanism hereinafter more fully described. With the inner housing assembly F thus restrained from rotation in a direction opposite to the direction of the rotation of the engine, it will be readily noted from Fig. 2 that if the gear 72, secured to the drive shaft 3 is driving in the same direction as the engine, as indicated by the arrow thereon in Fig. 2, the gears 84 and 85 will revolve in the directions as indicated by their arrows, Fig. 2. The reaction of the engagement of the gears 84 and 85 with the annular gear 95 in the inner housing assembly F fixed, as above mentioned, against rotation in one direction, will cause the gears 84 and 85 to move about the axis or center of the transmission assembly A, in the direction of its arrow, as indicated in Fig. 2 and which corresponds to the direction of clockwise rotation of the engine as above mentioned, the gears 84 and 85 operating as "planet" gears mounted on movable centers and moving about the gear 72 which is mounted on a fixed center and corresponds to the "sun" gear of a planetary transmission mechanism. The above mentioned operation of the gears 84 and 85 within the gear 95 will result in a change in the angular velocity of the gears 84 and 85 thus providing a change in the gear ratio, which in this case is a reduction, the nature of which is dictated by the relative ratios of the various gears. It is also to be noted that with the operation of the above mentioned gears 84 and 85 and the inner housing assembly F, the shafts 31 and 32 which carry the gears 74 and 75 will also in turn drive the gear 76 either in a forward or reverse direction as dictated by the positions of the gear 76 as hereinbefore disclosed.

It is to be noted that the inner housing assembly F which comprises the front end housing 38, the intermediate housings 40 and 41, the rear end housing 39, together with heir associated parts, can only revolve in one direction, namely forward or in the direction of the engine drive and never backwards or in a reverse direction.

Figure 11:
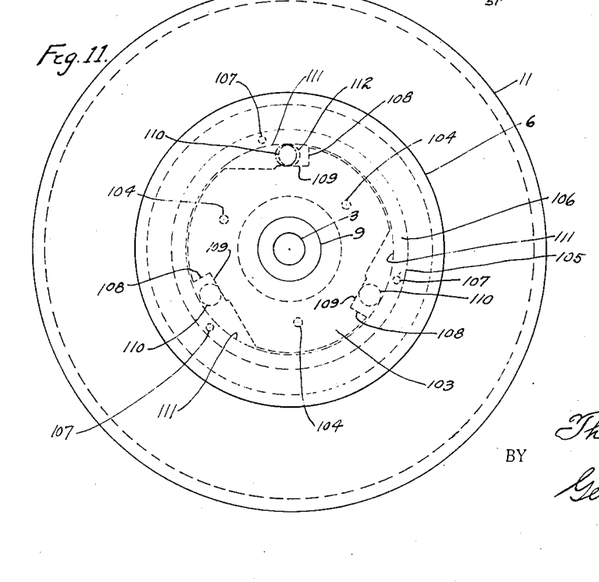
Fig. 11, a front end view of the transmission, less the clutch housing, disclosing the one way clutch mechanism thereof.

This is accomplished by the one way operation clutch mechanism, as disclosed in Figs. 1 and 11, and which is operatively connected between the extension portions 6 of the fixed transmission case 11 and the front end housing 38 of the movably mounted inner housing assembly F. The extension portion 6 of the transmission case 11 is provided with the flange 102 on which is mounted the inner member or cam 103 of the one way clutch mechanism, the inner member 103 being positively anchored therein by the suitably anchored pins 104.

The front end housing 38 of the movably mounted inner housing assembly F is provided with the bore 105 in which is mounted the outer member 106 of the one way clutch mechanism, the outer member 106 being positively anchored therein by the pins 107.

The inner member 103 is provided with the notches 108 which are provided with the cam surfaces 109 for engaging the rollers 110 which in turn engage the inner bore or annular surface 111 of the outer member 106, the rollers 110 being located slightly to one side of the center of radial lines extending through the axis of the drive shaft 3, as clearly disclosed in Fig. 11, when said rollers are in their wedged or locked position, the location of the rollers 110 off of the center line extending through said axis causing the rollers 110 to be immediately wedged between the cam surfaces 109 and the inner bore 111 when the revolvably mounted inner housing assembly F tries to rotate in an anti-clockwise direction, as viewed from the front end of the vehicle or in other words in an opposite direction from the direction of rotation of the engine, thus locking and preventing said inner housing assembly F from said anti-clockwise rotation, relative to the fixed transmission case 11, said movably mounted inner housing assembly F being permitted, by said one way clutch mechanism, to rotate only in a clockwise direction as viewed from the front end of the vehicle, or in other words in the direction of rotation of the engine, said clockwise rotation of said inner housing assembly F being more fully described hereinafter.

It is now to be noted that I have above described the two separate means in my transmission for receiving and transmitting the driving torque of the engine, namely one through the above described low speed gearing or gear mechanism and the other through the above described internal gearing or gearing mechanism.

Now it is to be noted that I have further provided the transmission with means for connecting the two above mentioned separate drives, said means comprising the flywheel or idler bracket 89 which is operatively connected with the said second mentioned separate drive by the planet gears 84 and 85 which engage the annular gear 95, secured in the inner housing assembly F, and the gear 72, which is secured to the drive shaft 3, said flywheel 89 being further operatively connected with the said first mentioned separate drive by the gear 99 which engages the gears 100 and 101 which are respectively connected with the shafts 31 and 32 which are in turn provided with the gears 74 and 75 for driving the gear 76 in one direction, said shafts 31 and 32 being further provided with the gears 84A and 85A for operatively driving said gear 76 in a reverse direction as above disclosed.

In operation when the engine is started, the gear 76 will be in a neutral position between the pair of gears 74 and 75 and the pair of gears 84A and 85A, as indicated by the dotted lines 113, Fig. 1, as a result of the operation of the one way clutch mechanism, the rollers 110 thereof moving from the position in which the center of the rollers are located off a line extending through the axis of the drive shaft 3 to a position, as indicated at 112, in which the center of the rollers 110 are located approximately on the line extending through the axis of the drive shaft 3, or in a similarly non-engaging or non-wedging position relative to the cam surfaces 109 and the bore 111, which allows the drive shaft 3 to rotate in the direction of rotation of the engine without transmitting any driving torque through said one way clutch mechanism, the gear 99, however, being forced or operated forward in the direction of the rotation of the engine drive, the gear 99 being operatively connected with the flywheel 89. Now it is to be noted that the energy or inertia of the moving flywheel 89, through the operative connection of the fly wheel 89, the gears 84 and 85, and the annular gear 95 secured to the front end housing 38, will move the movably mounted inner housing assembly F in the drive direction of the engine as the torque load imposed by the operatively connected driving parts, of the vehicle, decreases and the more the engine gains in speed, the more the internal housing assembly F, with its operatively connected gear and parts will move in the direction of the engine drive with the result that the whole mass of the inner housing assembly F together with its operatively connected gears and parts will revolve with the drive shaft 3 and at the same speed, and when the drive shaft 3 and the internal housing assembly F and its operatively connected gears and parts have attained to the same speed, the gears operatively connected with the internal housing assembly F will be stationary relative to said internal housing assembly F.

Now, if the gear 76 is shifted in either a forward or reverse position, as hereinbefore described, the main clutch 114 of the vehicle, operatively connecting the engine assembly B with the drive shaft 3, will be operatively controlled to assume its engaged position in which torque is transmitted from the engine assembly B to the drive shaft 3, and this will cause the rotation of the inner housing assembly F to slow down, the rotation of said inner housing assembly F and its operatively connected gears and parts decreasing its speed of rotation to the point when the vehicle begins to move, and if the torque load imposed on the transmission by the operation of driving the vehicle requires a full slow speed, the inner housing assembly F and its associated parts will be brought to a standstill. However, just as soon as the above mentioned torque load imposed on the transmission assembly by the driving operation of the vehicle decreases in any amount, the engine assembly B will immediately increase its speed of operation accordingly and the added or increased momentum acquired by the flywheel 89 will again move the inner housing assembly F and its operatively associated parts in the forward direction of movement. In other words, with my transmission, there is always the tendency to run in high speed.

For a clear understanding of my invention, it must always be borne in mind, that the two above mentioned and described separate gear drives must always be in harmony one with another, or in other words, if the inner housing assembly F stands still, which is the case when the transmission is driving through the first mentioned and described low speed gear drive mechanism, at the rear of the transmission assembly A, the flywheel or idler member 89 is forced ahead in the driving direction a certain amount and this same amount of motion must be obtained and registered by the second mentioned and described annular gear drive mechanism.

To further provide a balanced design to eliminate any unbalanced centrifugal forces, the gears 84 and 85 as well as the shafts 31 and 32 with their operatively associated gears will be located in oppositely disposed positions relative to the axis of the drive shaft 3, in a similar manner to that described relative to the gears 29 and 30. Also whereas I have disclosed single pairs of said gears and shafts as being oppositely disposed, a plurality of pairs of gears and shafts may be used when desired, the object being to always have all parts or members so located and balanced so that no unbalanced forces are set up at any time in the transmission assembly when the revolvably mounted portions thereof are operating.

The rim portion 91 of the flywheel member 89 may be constructed of the desired size or mass and so located outwardly from the axis of the drive shaft 3 to enable the flywheel member 89 to develop the required inertia forces or energy in operation to control the movement of the internal housing assembly F and its associated parts by its inertia or momentum forces in accordance with the amount of torque reaction imposed thereon in the transmission of the driving forces to the vehicle driving mechanism.

Thus the size and energy of the flywheel members will necessarily have to be developed in accordance with each installation of my transmission in a vehicle and it will undoubtedly be found in many instances that the rim portion 91 may be greatly decreased. Also it is to be noted that the use of the flywheel or idler bracket 89 together with its operatively associated parts rotating therewith to form a flywheel mass will permit the usual or conventional flywheel 115 to be greatly decreased in weight and size, thus accomplishing an initial saving in the manufacture of an important part of an engine assembly in a vehicle equipped with my transmission, the idler bracket or flywheel member 89 tending to always add its flywheel inertia effect to that of the conventional flywheel 115 of the engine assembly B.

In operation, the movement or motions of the inner housing assembly F together with its associated gears and parts will always be in the forward or driving direction and the movements of the two separate driving means together with the interconnecting means, therebetween, as above disclosed, must always be in harmony.

Also the inner housing assembly F will stand still during low speed operation only, during which operation the inner operatively connected gears and the shafts of the flywheel or idler bracket will move in the forward or driving direction.

With the inner housing assembly F locked or restrained by the one way clutch mechanism from backward movement and with the inertia energy of the relatively great mass of the housing members and flywheel mechanism together with their associated and operatively connected parts, the tendency of the mechanism to move in the forward or driving direction will always be fast and sensitively responsive to a change in the torque reactions opposing the driving operation of the transmission.

The torque reactions imposed by the load to be driven or moved, as by the operation of the vehicle or similar operating means, will be overcome by the kinetic energy of the flywheel or idler bracket 89 together with its operatively connected parts, said flywheel or idler bracket and parts developing energy to run ahead of said torque reactions.

The necessary speeds of operation of the transmission of the vehicle will be automatically and continuously attained, without the usual and conventional shift steps therebetween, and with smooth changes of driving speed which are resultant from and in accordance, at all times, with the torque load reactions imposed by the driving torque load reactions imposed by the driving torque of the driving axle assembly comprising the suitably mounted pinion 119 and ring gear 120 or similar driving mechanism of a vehicle or similar unit operatively equipped with my transmission mechanism, the driving ratios of the transmission, when the inner housing assembly F is revolving, being the result of the relative difference or differential movement between the rotating inner housing assembly F and the gear mechanism operatively driving same as above described.

When said torque reactions permit, as under driving conditions which require a full slow speed, the inner housing assembly F will be brought to a standstill, as above set out, then as said torque reactions decrease due to a decrease in the driving load, the engine will speed up and the added momentum of the flywheel mechanism will cause the inner driving assembly F and its operatively connected driving mechanism to revolve with the above mentioned differential movement relative to the main shaft 14, and then as said torque reactions further decrease and the speed of the engine further increases, the speed of the inner housing assembly F will further increase in the direction of the engine drive until the total revolving mass of internal housing assembly F and its operatively connected gear mechanism will revolve with and at the same speed of the drive shaft 3 together with the main shaft 14 and in which case the gears operatively mounted within the internal housing assembly F will be stationary relative to said internal housing assembly F.

In a model of my invention, as herein disclosed, which has been constructed, operated, and tested, the annular gear 95, the gears 84 and 85, and the gear 72 were constructed with the proper number of teeth to provide a four to one driving ratio thereof, and it must be borne in mind that whatever ratio is selected for the reduction through the annular gear drive mechanism, the same ratio must be used in the driving ratio through the separate drive mechanism at the rear of the transmission, said separate drive comprising the gear 28, the gears 29 and 30, and the gears 100 and 101, and when it is desired to construct a transmission with any other or desired driving gear ratio, the ratios of both driving gear means or mechanisms must be changed and maintained alike as both must operate in harmony as above stated.

When the transmission starts to operate, if the selected ratios of the separate drives are four to one, then a reduction ratio of four to one is immediately available if the torque reactions imposed are sufficient and as the vehicle begins to operate and as the torque reactions decrease, the flywheel energy increases and exceeds the torque reactions thus resulting in the automatic and smooth variations of driving speeds without the inconvenience of the conventional steps, as present in the present types of transmission devices, and eliminating the necessity of gear shifting means for changing the speeds, all of the gear members of the transmission being constantly in mesh with their respective operating gear members.

Also the operative mechanism of my transmission will provide "free wheeling" characteristics without the necessity of incorporating so called "free wheeling" mechanisms of the conventional overrunning type therein or therewith as is now necessary in the type of transmissions now used, said "free wheeling" characteristics being inherent in my transmission because the selection of the required driving speed is dependent upon and controlled by the reactions imposed by the delivered driving torque and when this becomes nil, as under so called "free wheeling" conditions in which the vehicle will tend to continue to move or travel by coasting, the torque reactions upon the main shaft 14 will also be nil, with the result that the mechanism of the two separate drives together with the connecting means therebetween will revolve relative to the drive shaft 3 and the inner housing assembly F to provide for the resultant difference in revolving speed between the drive shaft 3 and the main shaft 14 which is operatively connected with the driving axle of the vehicle in the "free wheeling" operation.

I am also aware that my transmission mechanism as disclosed can also be used by using the main shaft 14 as the drive shaft instead of the shaft 3, and that the drive shaft 3 can be also used as the driven shaft instead of the shaft 14, or in other words the driving torque could be imposed on the shaft at the rear end of the transmission, instead of the shaft at the front end of the transmission and this operation would have the result that for a decrease in the torque reactions imposed on the shaft used as a driver member, an increase or speeding up would occur in the movement of the shaft 3 which, in this operation, would be the driven member whereas formerly it was the driver member, and by suitable changes in the gear mechanism within the internal housing assembly F, other desired speed ratios can be obtained, care being always required that the total gearing in the two separate drive mechanisms must always be maintained in working harmony as above explained.

Figure 9:
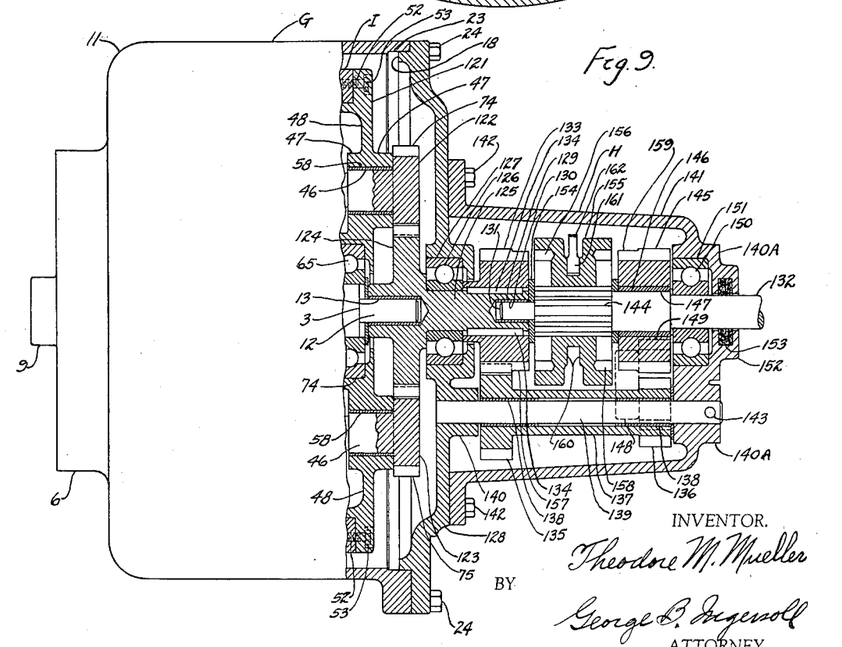
Fig. 9, a combined side and partial sectional views of my transmission equipped with a reverse gear mechanism having an annular gear type of shift mechanism.
Figure 10:
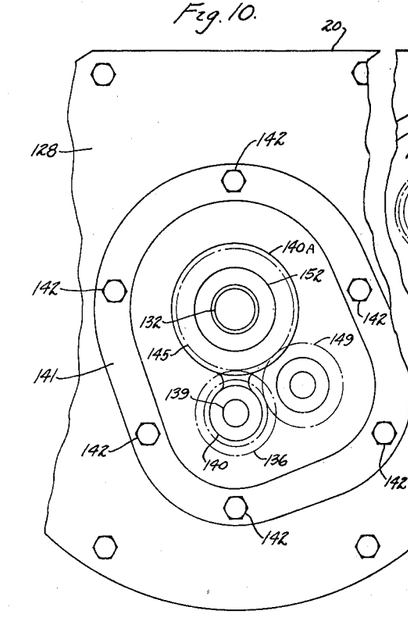
Fig. 10, a rear end view of the transmission disclosed in Fig. 9.

My transmission mechanism is also especially adapted for use in motor or speed boats or similar units and to adapt it for such or similar use and operation, the transmission assembly G, as disclosed in Fig. 9, may be provided with a reverse gear mechanism assembly H which will render my transmission especially applicable to said use and operation and at the same time provide it with a reverse gear mechanism similar in operation to that conventionally employed in such installations.

The construction and operation of the transmission assembly G, Fig. 9, is similar to that of the transmission assembly A, Fig. 1, said transmission assembly G being slightly changed in its component parts, at its rear end, to accommodate the reverse gear mechanism H.

In the transmission assembly G, the inner housing assembly I is closed at its rear end by the end housing 121 which supports the bushings 58 which forms bearings for the journal portions 46 of the shaft 122 and 123 which are provided respectively with the gears 74 and 75 which mesh and engage with the gear 124 which supports the bushing 13 and the stub end 12 of the drive shaft 3 operatively mounted therein, the gear 124 being suitably connected and supported by the intermediate shaft 125 which is revolvably supported in the bearing assembly 126 which is mounted in the bore 127 of the end cover 128 of the transmission case 11.

The intermediate shaft 125 is provided with the bushing 129 which forms a bearing on the journal portion 130 of the stub or extension portion 131 of the main or driven shaft 132 which is suitably and operatively connected with the propeller mechanism (not disclosed) of a boat or similar unit. The gear 133 is secured to the intermediate shaft 125 by the keys 134, said gear 133 meshing and operating with the gear 135 which is operatively secured to the gear 136 by the tubular shaft 137 which is provided with the bushings 138 which form bearings on the journal portions of the fixed shaft 139 which is supported at one of its ends in the boss 140 of the end cover 128 and at its other end in the boss portion 140A of the cover housing 141 which is suitably piloted and secured to the end cover 128 by the screws 142, the shaft 139 being fixed and restrained from turning by the pin 143.

The main driven shaft 132 is provided with the splines 144 and with the gear 145 which is revolvably mounted on the journal portion 146 of the main driven shaft 132, the gear 145 being provided with the bushing 147 which forms a bearing on the journal portion 146, the gear 145 operatively clearing the gear 136 but meshing with and engaging the gear 149 which is suitably mounted and supported in the bosses 148 and 140A of the cover housing 141, the gear 145 meshing and operatively engaging with the gear 149 which in turn meshes and operatively engages with the gear 136.

The main driven shaft 132 is supported at its rear end, in the bearing assembly 150 suitably secured in the bore 151 of the boss 140 of the cover housing 141.

The cover housing 141 is provided with the boss portion 152 which is provided with the packing gland 153 which engages and surrounds the shaft 132 for the purpose of preventing leakage of the lubricant from the cover housing 141.

The thrust washer 154 fits over the extension portion 131 of the shaft 132 and spaces the ends of the splines 144 from the gear 133.

The annular jaw clutch member 155 is slidably mounted on the splines 144 and is provided with the annular jaw clutch 156 for fitting over and engaging the clutch gear portion 157 at one end of its stroke, said jaw clutch member 155 being further provided with the annular jaw clutch 158 for fitting over and engaging the clutch gear portion 159 of the gear 145 at the other end of its stroke.

The annular jaw clutch member 155 is provided with the groove 160 in which fits and slidably operates the shift collar 161 which is provided with a lever portion 162 which may be suitably mounted and operatively connected with means (not shown) whereby the operator may shift the position of the annular jaw clutch member 155 from its neutral position as disclosed in Fig. 9, to engage the clutch gear portions 159 and 157 respectively of the gears 145 and 133.

It will be readily apparent from the above description that the transmission assembly G will operate in a similar manner to the transmission assembly A and by shifting the annular jaw clutch member 155 from its neutral position as disclosed in Fig. 9 to an engaged position relative to the gears 133 and 145, a forward or a reverse driving operation will be accomplished.

It is also to be understood that whereas I have disclosed my transmission as being especially applicable to operation in vehicles and similar units, I do not limit the use of my invention to such installations as it is readily adaptable to many and various mechanisms in which driving torque is transmitted.

I claim:

1. In a transmission for a vehicle provided with driving mechanism, the combination of a drive shaft revolvably mounted and operatively connected with the driving mechanism of the vehicle, a drive gear mounted on said drive shaft and adapted to revolve axially therewith, a main driven shaft revolvably mounted, a driven gear mounted on said main driven shaft and adapted to revolve therewith, a housing suitably mounted and adapted to revolve about said drive and said driven shafts, a countershaft revolvably supported by said housing, said countershaft having a gear mounted thereon and meshing with said drive gear on said drive shaft, said countershaft further having a second gear mounted thereon and meshing with said driven gear on said main driven shaft, said countershaft further having a third gear mounted thereon, an annular gear suitably mounted in said housing, a second drive gear mounted on said drive shaft and adapted to revolve axially therewith, a flywheel member revolvably mounted on said drive shaft and provided with a gear meshing with said third gear on said countershaft, said flywheel member being actuated by torque reactions imposed on said main driven shaft by the driving mechanism of the vehicle to cause said housing to revolve in the driving direction of said drive shaft, a pinion gear supported by said flywheel member and meshing with said annular gear and said second drive gear on said drive shaft, a second housing fixedly mounted and extending around said first mentioned housing, and a clutch mechanism operatively connected with said first mentioned and said second housings and restraining said first mentioned housing from revolving in one direction.

2. In a transmission, the combination of a drive gear shaft suitably mounted, a driven gear shaft suitably mounted, a plurality of gears operatively connecting said drive and said driven gear shafts, a housing rotatably mounted and supporting a plurality of gears, means operatively connected with and restraining said housing to rotate in one direction only, an internal gear mechanism operatively connecting said drive gear shaft and said housing, and means responsive to torque reactions imposed on said driven gear shaft and adapted to move said housing in the driving direction of said drive gear shaft with speeds varying with the intensity of said torque reactions, said means supporting a portion of said internal gear mechanism, said means being provided with a gear fixedly supported thereon and engaging said plurality of gears.

3. In a transmission the combination of a drive gear shaft suitably mounted, a driven gear shaft suitably mounted, a housing rotatably mounted, a plurality of gear means rotatably mounted about their axes, said plurality of gears being solely supported by said housing, said plurality of gears operatively connecting said drive and said driven gear shafts, a second gear means operatively connecting said drive gear shaft and said housing, said second gear means constituting the driving means between said drive gear shaft and said housing, and a member rotatably mounted on said drive gear shaft and movably responsive to variations in the intensity of torque reactions imposed on said driven gear shaft, said member being provided with a gear operatively connected with said plurality of gears together with means for supporting gears comprised by said second mentioned gear means, said member causing said driven gear shaft to operate with varying speeds.

4. In a transmission, the combination of a fixed housing, a carrier member supporting countershaft and rotatably mounted, a clutch mechanism operatively connected with said fixed and said carrier member, a driving gear mechanism suitably mounted and operatively connected with said carrier member, said driving gear mechanism comprising a drive gear member and an annular gear mounted on said carrier member, together with a plurality of pinion gears engaging said driving gear member and said annular gear, a driven shaft member suitably mounted and operatively connected with said driving gear mechanism, and means having flywheel characteristics and being movably responsive to torque reactions imposed on said driven shaft member to cause said carrier member to rotate with increasing speeds in accordance with a decrease in said torque reactions imposed on said driven shaft member, said carrier member and said driving gear mechanism thereby automatically controlling said driven shaft member to operate with varying speeds, said means supporting said pinion gears of said drive gear mechanism.

5. In a transmission, the combination of a drive shaft suitably mounted, and provided with a driving gear, a housing suitably mounted to revolve in one direction only, a planetary gear mechanism operatively connecting said housing and said drive shaft, said housing being driven by said planetary gear mechanism, a second gear mechanism suitably supported in portions of said housing and having a gear member meshing with the gear of said drive shaft, a driven shaft suitably mounted and operatively connected with said second gear mechanism, and means operatively connected with said planetary gear and said second gear mechanisms to cause said driven shaft to operate with speeds responsively changing in accordance with driving torque reactions imposed on said driven shaft.

6. In a transmission, the combination of a drive shaft suitably mounted and provided with a pair of drive gears mounted thereon and in axial alignment with said drive shaft, a driven shaft suitably mounted, a housing suitably mounted to revolve, an annular gear mechanism operatively connected with said drive shaft and said housing, said annular gear mechanism having a gear member meshing with one of the pair of drive gears mounted axially on said drive shaft, a second gear mechanism suitably mounted and operatively connected with said drive shaft and said driven shaft, said second gear mechanism having a gear member meshing with the other of the pair of drive gears mounted axially on said drive shaft, and means having flywheel characteristics and operatively connected with said annular gear mechanism and said second gear mechanism, said means being revolvably mounted on said drive shaft, said means being movably responsive to changes in torque reactions imposed on said driven shaft, said means automatically causing said gear mechanisms and said housing to operate at varying speeds to cause said drive shaft to operate at varying speeds as operatively required by the changes in said torque reactions imposed thereon.

7. In a transmission, the combination of a drive shaft suitably mounted and provided with a pair of drive gears mounted thereon and adapted to revolve therewith on the axis of the drive shaft, a driven shaft suitably mounted and provided with a driven gear mounted thereon and adapted to revolve therewith, a housing rotatably mounted relative to said drive and said driven shafts and provided with flange portions for supporting a plurality of shafts therein, a plurality of shafts each rotatably mounted in the flange portions of said housing, said plurality of shafts being adapted to rotate with said housing relative to said drive and said driven shafts, gear members suitably mounted on each of said plurality of shafts and operatively connecting one of the pair of drive gears on said drive shaft with the driven gear on said driven shaft to provide driving means between said drive and said driven shafts, an annular gear suitably connected to and supported by said housing, a torque responsive member rotatably mounted on said drive shaft between the pair of drive gears thereon and provided with a gear engaging one of said gear members on each of said plurality of shafts, said torque responsive member being responsive to torque reactions imposed on said driven shaft, gear members revolvably supported by said torque responsive member and engaging said annular gear together with one of the pair of drive gears on said drive shaft, said annular gear together with said gear members, revolvably mounted on said torque responsive member, and said one of the pair of gears mounted on said drive shaft forming driving means between said drive shaft and said housing for causing said housing to rotate.

8. In a transmission, the combination of a rotatably mounted housing provided with a pair of inwardly extending flanges, a plurality of countershafts rotatably mounted in the inwardly extending flanges of said rotatably mounted housing and each provided with gears, a drive shaft provided with a pair of gears, one of said gears meshing with one of the gears of each of said countershafts, a driven shaft provided with a gear meshing with one of the gears of each of said countershafts, gear means operatively connecting the other of the gears of said drive shaft with said rotatably mounted housing, and means operatively connecting said gear means with one of the gears of each of said countershafts.

9. In a transmission, the combination of a rotatably mounted housing provided with annular flanges, gears rotatably supported in the annular flanges of said rotatably mounted housing, a drive shaft provided with a pair of drive gears, one of said drive gears meshing with one of said gears rotatably supported in the annular flanges of said rotatably mounted housing, a driven shaft provided with a gear meshing with one of said gears rotatably mounted in the annular flanges of said rotatably mounted housing, gear means operatively connecting the other of the pair of drive gears of said drive shaft with said rotatably mounted housing, means operatively connecting said gear means with one of the gears rotatably mounted in the annular flanges of said rotatably mounted housing and responsive to torque reactions imposed on said drive shaft, a fixed housing, and clutch means operatively connecting said rotatably mounted housing and said fixed housing, said clutch mechanism restraining said rotatably mounted housing from rotating except in one direction.

10. In a transmission, the combination of a housing rotatably mounted and provided with annular flanges, countershafts rotatably mounted in the annular flanges of said housing and each provided with a plurality of gears, a drive shaft provided with a pair of drive gears, one of said drive gears meshing with one of the plurality of gears of each of said countershafts, a driven shaft, a gear slidably mounted on said driven shaft, reverse gears rotatably mounted in said housing and meshing with one of the plurality of gears of each of said countershafts, means for shifting said gear slidably mounted on said driven shaft to alternately engage one of the plurality of gears of each of said countershafts and said reverse gears to change the direction of rotation of said driven shaft, gear means operatively connecting the other of the pair of drive gears of said drive shaft with said housing, means operatively connecting said gear means with one of the plurality of gears of each of said countershafts, a fixed housing, and clutch means operatively connecting said first mentioned housing with said fixed housing, said clutch means restraining said first mentioned housing from rotating except in one direction.

11. In a transmission, the combination of a housing rotatably mounted, a bearing assembly mounted in the forward end of said housing, a second bearing assembly mounted in said housing at a point intermediate its ends, a drive shaft rotatably mounted in said first mentioned and said second bearing assemblies, said drive shaft being provided with drive gears each located adjacent one of said bearing assemblies, a fixed housing, a third bearing assembly located in the forward end of said fixed housing adjacent said first mentioned bearing assembly, said third bearing assembly further supporting said drive shaft, a fourth bearing assembly located in the rear end of said fixed housing, a driven shaft supported at its forward end on said drive shaft, said driven shaft being further supported in said fourth bearing assembly, gear means supported in said first mentioned housing and operatively connecting one of the drive gears of said drive shaft with said driven shaft, gear means operatively connecting the other of the drive gears of said drive shaft with said first mentioned housing, clutch means operatively connecting said first mentioned housing and said fixed housing, and means operatively connecting said first and said second mentioned gear means, said last mentioned gear means being movably responsive to torque reactions imposed on said driven shaft and adapted to move said first mentioned housing with increasingly higher speeds as said torque reactions decrease in intensity, said driven shaft being thereby caused to transmit decreasingly lower torques.

12. In a transmission, the combination of a housing rotatably mounted and provided with a plurality of annular flanges therein, a plurality of shafts rotatably mounted in the annular flanges of said housing, each of said shafts being provided with a plurality of gears, a drive shaft suitably mounted and provided with a pair of drive gears mounted thereon, one of said pair of drive gears on said drive shaft meshing with one of the gears of each of said first mentioned shafts, a driven shaft suitably mounted and provided with a gear movably mounted thereon and meshing with one of the gears of each of said first mentioned shafts, a plurality of reverse gears rotatably mounted in said housing and meshing with one of the gears of each of said first mentioned shafts, means for shifting the movably mounted gear on said driven shaft to engage one of the gears on each of said first mentioned shafts and said reverse gears, gear means operatively connecting one of the pair of drive gears mounted on said drive shaft and said housing, means operatively connecting said gear means with one of the gears on each of said first mentioned shafts, a fixed housing, and clutch means operatively connecting said first mentioned housing and said fixed housing.

13. In a transmission, the combination of an end housing, a pair of intermediate housings, a second end housing, means for securing said first mentioned end housing, said pair of intermediate housings and said second end housing together to form a housing assembly, means for rotatably supporting said housings, a drive shaft suitably mounted and provided with drive gears, a driven shaft suitably mounted, a gear movably mounted on said driven shaft, a plurality of gears rotatably supported in said intermediate and said second end housings, said gears operatively connecting the gear movably mounted on said driven shaft with one of the drive gears of said drive shaft, a gear mechanism operatively connecting one of the drive gears of said drive shaft with said first mentioned end housing, flywheel means operatively connecting said gear mechanism with one of said plurality of gears, reverse gears rotatably mounted in said second end housing and meshing with one of said plurality of gears, means for shifting the gear movably mounted on said driven shaft, a fixed housing, and clutch means operatively connecting said first mentioned end housing and said fixed housing.

14. In a transmission, the combination of a drive shaft revolvably mounted and provided with a pair of drive gears, a driven shaft revolvably mounted and provided with a gear mounted thereon, a housing rotatably mounted, a gear mechanism rotatably supported by said housing and operatively connecting one of the drive gears of said drive shaft with the gear mounted on said driven shaft, an annular gear mounted in said housing, a member rotatably mounted on said drive shaft and operatively connected with said gear mechanism, said member being movably responsive to torque reactions imposed on said driven shaft and adapted to cause rotation of said housing, shafts mountd in said member, pinion gears revolvably mounted on said shafts mounted in said member and engaging said annular gear together with one of the pair of drive gears of said drive shaft, and clutch means suitably mounted to restrain said housing to rotate only in one direction.

15. In a transmission, the combination of a drive shaft revolvably mounted and provided with a pair of drive gears, a driven shaft revolvably mounted, a gear movably mounted on said driven shaft, a housing rotatably mounted, gear mechanism revolvably supportd by said housing and operatively connecting one of the pair of drive gears of said drive shaft with said gear movably mounted on said driven shaft, a fixed housing, reverse gears supported in said first mentioned housing, draft means for shifting the gear movably mounted on said driven shaft to engage either said gear mechanism or said reverse gears, said draft means extending through a wall of said fixed housing, gear mechanism operatively connecting one of the pair of drive gears of said drive shaft with said first mentioned housing, a member rotatably mounted and operatively connecting said first mentioned and said last mentioned gear mechanisms, said member being movably responsive to torque reactions imposed on said driven shaft and adapted to rotate said first mentioned housing, and clutch means suitably mounted to restrain said first mentioned housing to rotate only in one direction.

THEODORE M. MUELLER.